(12) United States Patent
Wagner et al.

(10) Patent No.: US 11,434,857 B2
(45) Date of Patent: Sep. 6, 2022

(54) GAS/LIQUID COALESCING FILTER AUTO DRAIN

(71) Applicant: CUMMINS FILTRATION IP, INC., Columbus, IN (US)

(72) Inventors: Brian K. Wagner, Stoughton, WI (US); Bryan P. Steffen, Oregon, WI (US); Ayesha Saha, Rajasthan (IN); Erica C. Clark-Heinrich, Cookeville, TN (US); Anil I. Sawant, Pune (IN); Sonal Laxman Chirme, Maharasthra (IN); Mahesh Suresh Chindarkar, Maharasthra (IN); Barry Mark Verdegan, Stoughton, WI (US)

(73) Assignee: CUMMINS FILTRATION IP, INC., Columbus, IN (US)

( * ) Notice: Subject to any disclaimer, the term of this patent is extended or adjusted under 35 U.S.C. 154(b) by 0 days.

(21) Appl. No.: 16/756,291

(22) PCT Filed: Oct. 11, 2018

(86) PCT No.: PCT/US2018/055394
§ 371 (c)(1),
(2) Date: Apr. 15, 2020

(87) PCT Pub. No.: WO2019/079094
PCT Pub. Date: Apr. 25, 2019

(65) Prior Publication Data
US 2020/0318589 A1 Oct. 8, 2020

Related U.S. Application Data

(60) Provisional application No. 62/575,226, filed on Oct. 20, 2017.

(51) Int. Cl.
*F16K 31/02* (2006.01)
*F02M 37/08* (2006.01)
(Continued)

(52) U.S. Cl.
CPC ......... *F02M 37/08* (2013.01); *B01D 29/0072* (2013.01); *B01D 36/003* (2013.01); *F02M 37/24* (2019.01)

(58) Field of Classification Search
CPC .... F02M 37/08; F02M 37/24; B01D 29/0072; B01D 36/003
(Continued)

(56) References Cited

U.S. PATENT DOCUMENTS 3,966,603 A * 6/1976 Grant ................. B01D 17/0214
210/86
4,372,847 A 2/1983 Lewis
(Continued)

FOREIGN PATENT DOCUMENTS

CN 204041317 12/2014
CN 204436652 U * 7/2015 ............. F02M 37/22
(Continued)

OTHER PUBLICATIONS

International Search Report from PCT Application No. PCT/US2018/055394, dated Dec. 21, 2018, pp. 1-2.
(Continued)

*Primary Examiner* — Hung Q Nguyen
*Assistant Examiner* — Anthony Donald Taylor, Jr.
(74) *Attorney, Agent, or Firm* — Foley & Lardner LLP

(57) ABSTRACT

Various example embodiments relate to an automatic drain system for use with a fluid water separator. The automatic drain system includes a liquid-in-fuel sensor. The liquid in-fuel sensor is configured to detect a liquid level in a water sump. The solenoid has an open state and a closed state. A control unit is configured to activate the solenoid in response to a signal from the liquid-in-fuel sensor. Activation of the solenoid causes the solenoid to go from the closed state to the open state. The automatic drain system is placed in a (Continued)

condition for allowing fluid flow through the automatic drain system from the water sump.

20 Claims, 3 Drawing Sheets

(51) Int. Cl.
*F02M 37/24* (2019.01)
*B01D 29/00* (2006.01)
*B01D 36/00* (2006.01)

(58) Field of Classification Search
USPC .................................................. 251/129.15
See application file for complete search history.

(56) References Cited

U.S. PATENT DOCUMENTS

| | | | |
|---|---|---|---|
| 4,539,109 A * | 9/1985 | Davis | F02M 31/125 210/104 |
| 4,637,351 A * | 1/1987 | Pakula | F02M 25/0222 123/25 J |
| 4,799,504 A * | 1/1989 | Scragg | F02M 37/50 137/38 |
| 5,053,120 A * | 10/1991 | Mollmann | B01D 36/005 123/25 J |
| 5,061,300 A | 10/1991 | Alexander, III | |
| 5,462,658 A | 10/1995 | Sem | |
| 5,505,165 A | 4/1996 | Kimoto | |
| 6,207,045 B1 * | 3/2001 | Jiang | B01D 17/0214 210/114 |
| 6,270,659 B1 * | 8/2001 | Bagci | B01D 36/001 210/111 |
| 6,371,087 B1 | 4/2002 | Condran et al. | |
| 6,422,396 B1 | 7/2002 | Li et al. | |
| 6,444,121 B1 | 9/2002 | Maxwell | |
| 6,517,615 B2 | 2/2003 | Miller et al. | |
| 6,526,741 B2 | 3/2003 | Whitehead et al. | |
| 6,783,665 B1 * | 8/2004 | Girondi | B01D 35/143 210/114 |
| 7,150,269 B2 | 12/2006 | De Monts De Savasse et al. | |
| 7,445,704 B2 * | 11/2008 | Jorgensen | B01D 17/045 210/86 |
| 7,527,739 B2 | 5/2009 | Jiang et al. | |
| 7,571,646 B1 | 8/2009 | Houghton | |
| 7,655,140 B2 * | 2/2010 | Wieczorek | F02M 37/44 210/120 |
| 7,775,189 B2 | 8/2010 | Bejcek et al. | |
| 7,938,963 B2 | 5/2011 | Klein et al. | |
| 8,017,020 B2 | 9/2011 | Hoskin et al. | |
| 8,127,597 B2 * | 3/2012 | Staley | G01N 11/00 73/53.05 |
| 8,409,446 B2 * | 4/2013 | Abdalla | B01D 36/006 210/744 |
| 8,733,087 B2 | 5/2014 | Core | |
| 8,783,007 B2 | 7/2014 | Mestroni et al. | |
| 8,893,689 B2 | 11/2014 | Dawar et al. | |
| 8,977,473 B2 | 3/2015 | Brown | |
| 9,212,627 B2 * | 12/2015 | Fulton | F02M 25/0222 |
| 9,255,829 B2 | 2/2016 | Leone et al. | |
| 9,353,713 B2 | 5/2016 | Terry et al. | |
| 9,422,900 B2 | 8/2016 | Pursifull | |
| 9,464,596 B2 | 10/2016 | Leone et al. | |
| 9,574,469 B2 | 2/2017 | Dawar et al. | |
| 9,764,255 B1 * | 9/2017 | Mueller | B01D 19/0073 |
| 2004/0046142 A1 * | 3/2004 | Wilson | F02M 37/28 251/129.15 |
| 2006/0070956 A1 | 4/2006 | Herrmann et al. | |
| 2006/0277899 A1 * | 12/2006 | Ruona | F01N 3/005 60/286 |
| 2007/0039865 A1 | 2/2007 | Jiang et al. | |
| 2007/0240392 A1 | 10/2007 | Ng et al. | |
| 2008/0035537 A1 | 2/2008 | Klein et al. | |
| 2008/0110812 A1 * | 5/2008 | Jensen | F02M 37/32 210/143 |
| 2008/0314128 A1 | 12/2008 | Carmona et al. | |
| 2009/0065419 A1 | 3/2009 | Jiang | |
| 2009/0113880 A1 | 5/2009 | Clausen | |
| 2009/0173639 A1 * | 7/2009 | Ferrari | F02M 37/28 210/744 |
| 2009/0188755 A1 | 7/2009 | Staley et al. | |
| 2009/0289013 A1 | 11/2009 | Hoskin et al. | |
| 2010/0154727 A1 * | 6/2010 | Malgorn | B01D 17/0217 210/708 |
| 2010/0192529 A1 | 8/2010 | Schuster | |
| 2011/0041920 A1 | 2/2011 | Abdalla | |
| 2011/0180051 A1 | 7/2011 | Schwandt et al. | |
| 2011/0180052 A1 | 7/2011 | Schwandt et al. | |
| 2011/0259802 A1 | 10/2011 | Wieczorek et al. | |
| 2011/0300787 A1 * | 12/2011 | Bierl | B60K 15/03504 454/141 |
| 2012/0240901 A1 | 9/2012 | Yamada et al. | |
| 2012/0312022 A1 | 12/2012 | Lam et al. | |
| 2013/0153487 A1 | 6/2013 | Terry et al. | |
| 2013/0206114 A1 | 8/2013 | Bejcek et al. | |
| 2013/0255636 A1 | 10/2013 | Pursifull | |
| 2013/0291499 A1 | 11/2013 | Gardner | |
| 2014/0007771 A1 | 1/2014 | Chase et al. | |
| 2014/0260133 A1 | 9/2014 | Von Seggern | |
| 2014/0284263 A1 | 9/2014 | Duerr et al. | |
| 2014/0284264 A1 | 9/2014 | Klein et al. | |
| 2014/0284268 A1 | 9/2014 | Volkmer | |
| 2014/0311963 A1 | 10/2014 | Bortnik et al. | |
| 2015/0027422 A1 | 1/2015 | Schwandt et al. | |
| 2015/0047582 A1 | 2/2015 | Dawar et al. | |
| 2015/0122720 A1 | 5/2015 | Boiger et al. | |
| 2015/0182878 A1 | 7/2015 | Bultinck et al. | |
| 2015/0192450 A1 | 7/2015 | Leone et al. | |
| 2015/0240738 A1 | 8/2015 | Yerace et al. | |
| 2015/0284268 A1 | 10/2015 | Buttner | |
| 2015/0300222 A1 | 10/2015 | Khan et al. | |
| 2016/0222932 A1 | 8/2016 | Koppi et al. | |
| 2016/0263509 A1 | 9/2016 | De Wolf et al. | |
| 2016/0273471 A1 * | 9/2016 | Shimpi | B01D 37/02 |
| 2016/0296856 A1 | 10/2016 | Bultinck et al. | |
| 2017/0021295 A1 | 1/2017 | Willems et al. | |
| 2017/0335812 A1 * | 11/2017 | Xiao | B01D 36/005 |

FOREIGN PATENT DOCUMENTS

| | | |
|---|---|---|
| CN | 204436652 U | 7/2015 |
| CN | 2044366520 | 7/2015 |
| CN | 105764591 | 7/2016 |
| CN | 105927433 A | 9/2016 |
| GB | 2 065 336 A | 6/1981 |
| JP | 2013-029041 | 2/2013 |
| RU | 159746 | 2/2016 |
| WO | WO-2017/031128 | 2/2017 |
| WO | WO2017031128 A1 * | 2/2017 ............. F02M 37/22 |

OTHER PUBLICATIONS

Written Opinion from PCT Application No. PCT/US2018/055394, dated Dec. 21, 2018, pp. 1-6.
First Office Action issued for Chinese Patent Application No. 201880066548.2, dated May 28, 2021, 10 pages.
First Office Action issued for Indian Patent Application No. IN 201847000508, dated Feb. 10, 2020, 5 pages.
Second Office Action issued for Chinese Patent Publication No. CN2016800427269, dated Feb. 12, 2020.
First Office Action issued for Indian Patent Application No. 202047010181, dated Apr. 19, 2021, 6 pages.
International Search Report and Written Opinion issued for PCT/US2016/047204, dated Nov. 14, 2016, 11 pages.
Chinese Office Action issued for Chinese Patent Application No. CN 202010670202.2 dated Sep. 14, 2021, 7 pages.
Office Action and Search Report issued for Russian Patent Application No. RU 2020113386 dated Feb. 10, 2022, 9 pages plus translation of Office Action.

(56) References Cited

OTHER PUBLICATIONS

Second Office Action issued for Chinese Patent Application No. CN 201880066548.2, dated Jan. 29, 2022, 15 pages.

* cited by examiner

GAS/LIQUID COALESCING FILTER AUTO DRAIN

CROSS-REFERENCE TO RELATED PATENT APPLICATIONS

The present application is the U.S. national phase of PCT Application No. PCT/US2018/055394, filed Oct. 11, 2018, which claims priority to U.S. provisional patent application No. 62/575,226, filed Oct. 20, 2017, the contents of which are incorporated herein by reference.

FIELD

The present application relates generally to fuel water separator filter systems.

BACKGROUND

Fuel water separator filters that filter fuel, for example diesel fuel, and also separate water from the fuel before the fuel is passed to the engine are known. Various fuel water separator filter constructions are described in, for example, U.S. Pat. Nos. 7,857,974 and 7,935,255. Periodic draining of the water that is separated from the fuel by the fuel water separator filter is generally required.

Mixtures may include two immiscible constituents in various applications. For example, a mixture may have a continuous phase and a dispersed phase. Common mixtures include water and fuel (e.g., diesel, kerosene, gasoline, etc.), oil and water, water and air, oil and air, water and natural gas, and oil and natural gas. In many applications, it is desirable to separate the dispersed phase from the continuous phase. For example, the separation of the dispersed phase from the continuous phase is important in many industrial, commercial, and residential applications. In one application, the removal of water (i.e., the dispersed phase) from fuel (i.e., the continuous phase) is important in fuel filtration for internal combustion engines because the water may cause corrosion of components within the internal combustion engines. One way to achieve the separation is to filter the mixture through a coalescing filter element (referred to as a "coalescer"). In many applications, including fuel-water separation, coalescers are used to achieve high contaminant (e.g., water droplets from fuel) removal.

Unlike particulate filters, coalescing filters (e.g., coalescers, etc.) are intended to capture and remove the dispersed phase from the continuous phase and to drain the dispersed phase from the coalescing filter media (e.g., filter media, etc.), not accumulate it indefinitely as done in typical particulate filters. In the absence of solid contaminant, coalescers can achieve a steady state, whereby the rate of dispersed phase entering the filter media equals the rate at which it is drained or released. The relative amount of contaminant held by the coalescing filter media is expressed as its "saturation." Drops of coalesced water are not subject to breakup by turbulence and readily settle into a liquid collection sump below the coalescer element. While the liquid collection sump is structured to retain water, in certain applications, removing coalesced and precipitated liquids from a gaseous filter housing is essential to prevent damage to downstream components while maintaining a proper air to fuel ratio in the engine.

SUMMARY

Various example embodiments relate to an automatic drain system for use with a fluid water separator. The automatic drain system includes a liquid-in-fuel sensor. The liquid in-fuel sensor is configured to detect a liquid level in a water sump. The solenoid has an open state and a closed state. A control unit is configured to activate the solenoid in response to a signal from the liquid-in-fuel sensor. Activation of the solenoid causes the solenoid to change from the closed state to the open state. The automatic drain system is placed in a condition for allowing fluid flow through the automatic drain system from the water sump.

Various other example embodiments relate to a fluid water separator system. The fluid water separator system includes an automatic drain system and a housing. The housing includes an upper housing portion, a lower housing portion, and an inner housing portion. The lower housing portion includes an inlet opening. The inner housing portion includes a drain opening. The inner housing portion is disposed between the upper housing portion and the lower housing portion. The automatic drain system includes an interior portion that is in fluid communication with the inlet opening of the housing and allows fluid to flow into the automatic drain system. A liquid in-fuel sensor is configured to detect a liquid level in a water sump. The solenoid has an open state and a closed state. A control unit is configured to activate the solenoid in response to a signal from the liquid-in-fuel sensor. Activation of the solenoid causes the solenoid to change from the closed state to the open state. The automatic drain system is placed in a condition for allowing fluid flow through the automatic drain system from the water sump.

Embodiments of this disclosure relate generally to an automatic drain system for fuel water separator filter systems. More specifically, the embodiments relate to an automatic drain system that includes electronic sensors to automatically drain water from a fuel water separator filter system without active involvement of the user.

BRIEF DESCRIPTION OF THE DRAWINGS

References are made to the accompanying drawings that form a part of this disclosure, and which illustrate the embodiments in which the systems and methods described in this specification can be practiced.

DETAILED DESCRIPTION

Figure 1B:
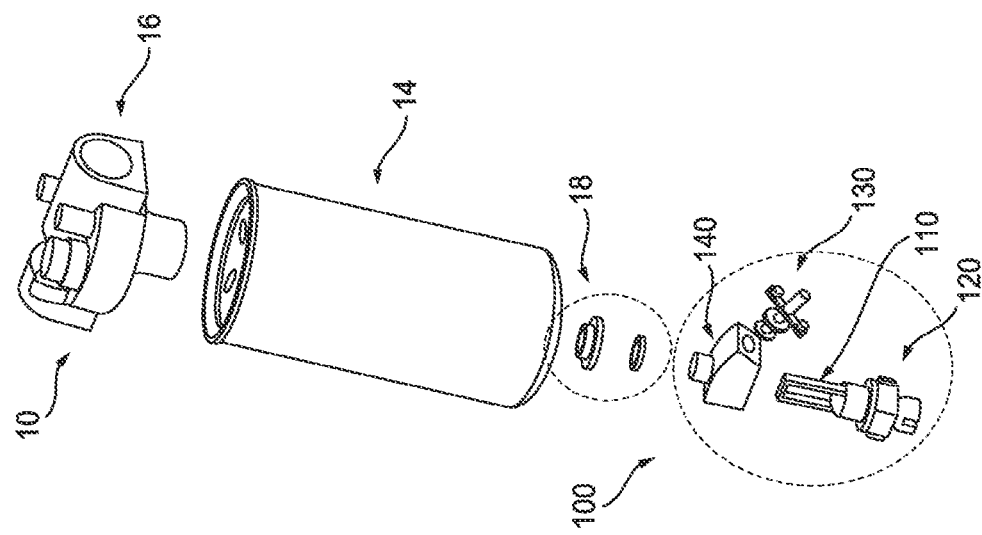
FIG. 1B is an exploded cross-sectional view of the automatic drain system for the pressurized fuel water separator of FIG. 1A.

In pressurized fluid water separator (herein referred to as "FWS") filter systems (for use with, e.g., compressed natural gas ("CNG"), liquefied natural gas ("LNG"), etc.), failure to drain the collected liquids of the FWS filter system on a regular (e.g., daily) basis can alter the air-to-fuel ratio to the engine and cause damage to downstream components. FWS filter systems require the periodic draining of collected liquids that has been removed from the fuel and stored in a water sump. Currently, an operator of a pressurized FWS filter system must manually monitor and drain the system of any collected liquids (e.g., coalesced and precipitated liquids). A FWS filter system may include a filter element and a filter housing including the water sump. The failure to drain the separated water may result in system failures, with the attendant repair and maintenance costs. Additionally, the manual drainage of the liquids can release harmful gases (e.g., hydrocarbons, natural gas condensate, etc.) into the atmosphere. Embodiments described and depicted herein relate generally to an automatic drain system for a FWS filter system.

Automatic drain systems for use with FWS filter systems as described herein operate independently of user control to drain the water from a FWS, and thus remove the possibility that a user's failure to drain the water from a FWS system may result in increased maintenance and repair costs. More specifically, the embodiments relate to an automatic drain system that automatically removes the collected liquids from a gaseous filter housing, thereby maintaining a proper air-to-fuel ratio to the engine and limiting the release of harmful gases during the drainage process. Additionally, an automatic drain system as described herein allows water to be drained from a FWS filter system while the FWS filter system is in active use, such as when an engine supplied by the FWS filter system is in operation.

Generally, the automatic drain system includes a solenoid, an electronic control unit ("ECU"), and a liquid-in-fuel sensor (and more specifically a water-in-fuel ("WIF") sensor). The automatic drain system is structured to monitor collected liquid levels in the liquid collection sump, or similar structure, in a filter housing. At a determined interval (e.g., collected liquid height, time of day, run time, etc.), the automatic drain sends a signal to the engine ECU and starts the automatic draining process. The removal of the collected liquid will prevent the collected liquid from entering the fuel stream and damaging downstream the fuel delivery components or the engine. In some embodiments, the automatic drain system includes one or more sensors to detect stored liquids and stored or evaporated hydrocarbons. The automatic drain system may further provide a safe canister or plumbing to facilitate temporary storage of drained liquids. Further, an operator alarm system provides build up notifications, drainage status, external container capacity, and other automatic drain system processes. Through the operator alarm system, the automatic drain system operates as a warning device to the operator to prevent damage to the downstream components and to signal the maintenance of a proper air-to-fuel ratio to the engine. The automatic drain system is applicable to both stationary and moving FWS applications.

In one embodiment, the automatic drain system is configured for use with a FWS filter system located on a suction, low pressure, side of the filter. In other embodiments, the automatic drain system is configured for use with a FWS filter system located on a high pressure side of the filter. In some embodiments, the design of the automatic drain system produces a substantially constant mass flow rate of liquid from the FWS, through the automatic drain system, and out of the FWS.

Figure 1A:
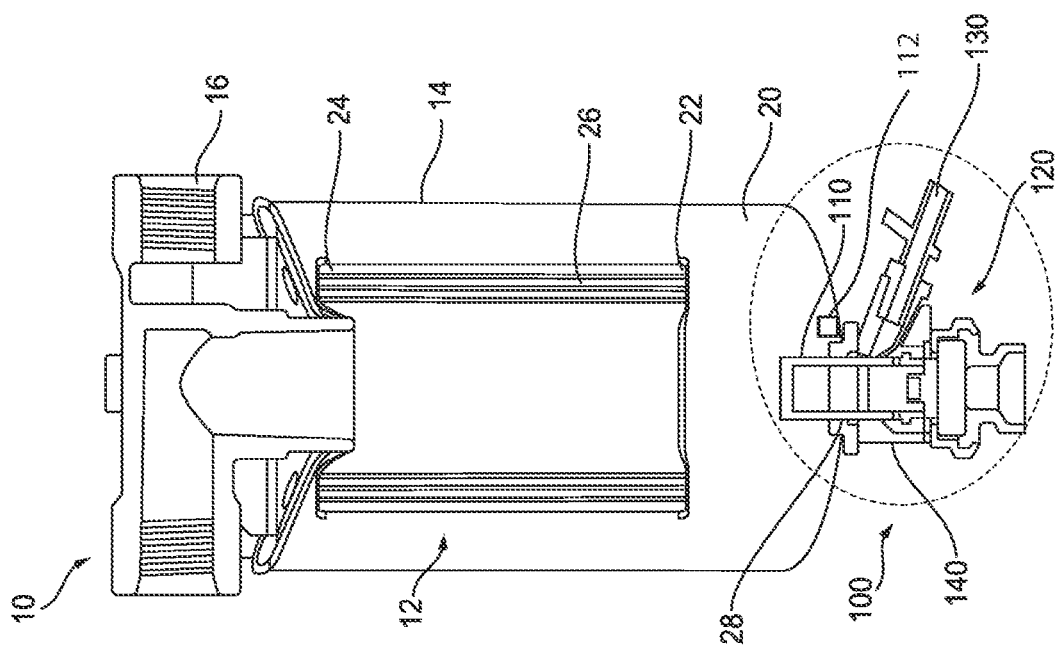
FIG. 1A is a cross-sectional view of an automatic drain system for a pressurized fuel water separator, according to an example embodiment.

Referring to FIG. 1A, a cross-sectional view of an automatic drain system 100 for a FWS 10 is shown, according to an example embodiment. The pressurized FWS 10 includes a filter element 12, a housing 14, a filter head 16, an attachment member 18, and the automatic drain system 100. The FWS 10 is structured to separate two immiscible phases of a mixture (e.g., fuel or lubricant and water) into a continuous phase (e.g., herein referred to as "fuel") and a dispersed phase (herein referred to as "liquid"). As the mixture passes through the filter element 12, the dispersed phase is captured and coalesced. The liquid falls along the housing 14, in the direction of gravity, and axially enters the liquid collection sump 20 disposed in the housing 14. In some embodiments, the FWS 10 is an inside-out coalescer, however, in other embodiments, the FWS 10 is an outside-in coalescer.

The automatic drain system 100 avoids issues that arise when a user is unaware of the requirement that a liquid collection sump 20 of a FWS 10 be drained periodically. The automatic nature of the drain device removes the draining from dependence on the user, and may avoid malfunctions and damage associated with a failure to drain the liquid collection sump 20. Additionally, the automatic drain system 100 allows the liquid collection sump 20 to be drained while the FWS 10 system is in operation or while the FWS 10 system is at rest.

The housing 14 is structured to sealingly engage the filter head 16. In some embodiments, the filter head 16 is engaged to an upper portion of the housing 14. The filter head 16 includes an inlet passage and an outlet passage. The inlet passage transports a mixture of fuel or lubricant and liquid. The mixture has two immiscible phases that are passed through and separated by the filter element 12. The outlet receives the filtered fuel or lubricant. The inlet and outlet of the filter head 16 are dependent on whether the FWS 10 is an inside-out coalescer or an outside-in coalescer.

The filter element 12 includes a first endplate 22, a second endplate 24, and filter media 26. In some arrangements, the filter element 12 is a cylindrical filter element. The filter element 12 may be, for example, a fuel filter element, an oil filter element, an air filter element, a crankcase ventilation filter element, a water filter, or the like. In a particular embodiment, one of the first endplate 22 and the second endplate 24 is an open endplate (with at least one opening defined therein), with the other of the first endplate 22 and the second endplate 24 being a closed endplate (with no opening defined therein).

The filter media 26 is structured to separate two immiscible phases of a mixture into liquid and fuel or lubricant. Accordingly, as the mixture passes through the filter media 26, the liquid is captured and coalesced by the filter media 26. The coalesced liquid falls along the inside of the filter element 12, in the direction of gravity, to the liquid collection sump 20 of the housing 14. The liquid remains disposed in the liquid collection sump 20 unless the liquid level exceeds an amount that causes the liquid to enter the flow stream.

The housing 14 includes a central compartment structured to receive the filter element 12 and a liquid collection sump 20. Although the housing 14 is shown arranged as a cylindrical housing having a circular cross-sectional shape, the housing 14 can be arranged in other shapes to receive the filter element 12. The housing 14 may include the liquid collection sump 20 (e.g., water sump) integrally formed therein. However, in some embodiments, the liquid collection sump 20 and the housing 14 are separate elements. While the automatic drain system 100 and the housing 14 are shown as separate elements, in some embodiments, one or more components of the automatic drain system 100 are integrally formed with the housing 14.

At least one drain opening 28 is included in the housing 14. As shown in FIG. 1A, the at least one drain opening 28 is disposed in a lower portion of the housing 14. The at least one drain opening 28 allows fluid, such as water, to flow from the liquid collection sump 20 of the FWS 10 to an interior portion of the automatic drain system 100. The housing 14 includes an attachment member 18 between the automatic drain system 100 and the housing. In some embodiments, the attachment member 18 is a seal member (e.g., O-ring or other resilient seal) between the automatic drain system 100 and the housing 14. A seal member may be provided to ensure a fluid tight seal is formed between the automatic drain system 100 and the housing 14. The end of the housing 14 and the automatic drain system 100 may be attached through a threaded engagement. In other embodiments, at least one air vent 112 is also provided in the housing 14 to allow air to be communicated from the interior portion of the automatic drain system 100 to the FWS 10. The air vent 112 may be located at a higher fluid level than the at least one drain opening 28 when the automatic drain system 100 is installed in the FWS 10.

The automatic drain system 100 includes a WIF sensor 110, a controller 120, a drain port 130, and a solenoid 140. While the automatic drain system 100 is shown with a single WIF sensor 110, in some embodiments, additional sensors are disposed in the FWS 10 to monitor hydrocarbon levels, external container levels, emissions, etc. The automatic drain system 100 is configured to detect the level of liquid collected in the liquid collection sump 20 and initiate the automated draining of the liquid collection sump 20. As will be appreciated, the automatic drain system 100 may protrude into the liquid collection sump 20 in order to accurately monitor the liquid level. The automatic drain system 100 is configured to drain while the engine is running or when the engine is shut down. In some embodiments, the connections between the controller 120, the solenoid 140, and the WIF sensor 110 may be made without the use of external wiring, such that the connections are contained entirely within the automatic drain system 100.

In some embodiments, the automatic drain system 100 may be a self-contained unit. As a self-contained unit, the automatic drain system 100 may be retrofitted onto a pre-existing FWS 10. Further, the controller 120 of the device may be capable of fully independent operation, thereby requiring no modifications to an ECU of an engine supplied by the FWS 10 system. The independent nature of the automatic drain system 100 allows the automatic drain system 100 to be employed with both electronically controlled and mechanically controlled engine systems. The automatic drain system 100 may not include any external wires or connections with a wiring harness. In other embodiments, the controller 120 of the automatic drain system 100 may be configured to interface with an ECU of an electronically controlled engine system. The ECU can monitor the draining activities of the automatic drain system 100, and the automatic drain system 100 can supply error messages to the ECU for user notification. Example schematics flows of the automatic drain system 100 are described in greater detail below in FIGS. 2 & 3.

The WIF sensor 110 is communicably connected to the controller 120 and is structured to monitor a liquid level in the liquid collection sump 20. The WIF sensor 110 monitors if the liquid level reaches a desired sump capacity level. The desired sump capacity level is the liquid level of the collected liquid for which it is preferred to drain the liquid collection sump 20 to avoid the collected liquid from entering the fuel stream and damaging the engine or components downstream. In some embodiments, the WIF sensor 110 includes an upper WIF sensor and a lower WIF sensor. The detection of liquid by the upper WIF sensor indicates that the liquid level in the liquid collection sump 20 of the FWS 10 has reached a level where draining is required. The detection of liquid by the lower WIF sensor indicates a liquid is present in the liquid collection sump 20 of the FWS 10. The absence of liquid by the lower WIF sensor may cause the solenoid 140 to close, thereby completing the draining process. In the absence of a lower WIF sensor, a timed release may be implemented with a predetermined open time calculated from a timer algorithm of a predetermined liquid density and quantity of typical precipitate/liquid.

In some embodiments, additional sensors are implemented in the automatic drain system 100. The WIF sensor 110 or other sensors may be similar to the sensors described in U.S. patent application Ser. No. 15/231,198, filed Aug. 8, 2016, and herein incorporated by reference in its entirety. The WIF sensor 110 or other sensors can be a sensor tube with a distal end which is a gas separator to prevent gas bubbles from moving up into the sensor tube. The sensor tube includes tube wires that extend through a connection block and the resistance of the tube segment above the fluid level is infinite because the air between the tube wires acts as an insulator. Accordingly, the higher the fluid level, the less resistance between the tube wires, and thereby the lower the voltage at a direct current (DC) voltmeter. The WIF sensor 110 is safe for use with both the gases (e.g., methane) and liquids present. The WIF sensor 110 may be, for example, a capacitance type, a float type, or other similar sensor types.

In certain embodiments, a sensor (herein described as a "HHC sensor") is disposed in a heavy hydrocarbon and liquid storage tank. The heavy hydrocarbon and liquid storage tank may be similar to a collection chamber. The HHC sensor is structured to determine when the FWS 10 would require service due to contents in the storage tank. The HHC sensor is operably connected to an alert system that notifies a user to initiate manual draining of the storage tank. Further, a sensor (herein described as a "HC sensor") may be disposed in a hydrocarbon and liquid storage tank. The HC sensor is structured to detect evaporative hydrocarbons in the heavy hydrocarbon and liquid storage tank. When a determined level of evaporative hydrocarbons are identified by the HC sensor, a solenoid is activated to release the evaporative hydrocarbons into an evaporation canister with an absorption agent. The absorption agent cleans that hydrocarbons, allowing clean air to be released into the environment. The absorbent agent may be any appropriate material, such as sponge or activated carbon.

The drain port 130 is structured to facilitate drainage of the liquid in the liquid collection sump 20 out of the FWS 10. The drain port 130 has an open position and a closed position. The open and closed position of the drain port 130 are controlled by the solenoid 140. In some embodiments, the drain port 130 may open into a collection container. The collection container is structured to receive the automatically drained liquid. The collection container may include a sensor to alert a user of the contents of the collection container. In some embodiments, the collection contained includes a vapor recovery system structured to handle liquids that have returned to a gaseous state (e.g., drip gas).

The controller 120 is communicably coupled to the WIF sensor 110 and the solenoid 140. The controller 120 is structured to operate the solenoid based on the information received from at least the WIF sensor 110. The controller 120 may include a processor and memory, and may be programmed specifically to achieve the desired operation of the automatic drain system 100. The connections between the controller 120, the solenoid 140, and the WIF sensor 110 may be made without the use of external wiring, such that the connections are contained entirely within the automatic drain system 100. The controller 120 may also be connected to an electronic control module ("ECM") of a vehicle, a filter monitoring system ("FMS"), or other device or system in which the FWS 10 is included. Connection to the ECM or ECU allows for monitoring of the activities of the automatic drain system 100 may be monitored by the ECM or ECU and error messages may be communicated from the controller 120 to the ECM or ECU. In some embodiments, the controller 120 is communicably coupled to an operator alarm system.

The controller 120 may be programmed to activate the automatic drain system 100 when the WIF sensor 110 detects the presence of liquid. Detection of liquid by the WIF sensor 110 indicates that the liquid level in the liquid collection sump 20 of the FWS 10 has reached a level where draining is required. Accordingly, the controller 120 then activates the solenoid 140 by sending an electrical signal to cause the solenoid 140 to move from the closed position to an open position. The activation of the solenoid 140 by the controller 120 may be delayed by a predetermined amount of time after the detection of liquid by the lower WIF sensor. In some embodiments, the controller 120 includes a predetermined amount of time to maintain the solenoid 140 in an open position. The predetermined time is associated with a time needed to drain a desired amount of liquid from the FWS 10 through the drain port 130 and out of the FWS 10. After the desired amount of liquid is drained from the liquid collection sump 20, the controller 120 stops the activation of—or returns to a closed positon—the solenoid 140.

The solenoid 140 is disposed on or in the flow path of the liquid from the liquid collection sump 20 to the drain port 130. The solenoid 140 includes a plunger. The plunger of the solenoid 140 may be configured to prevent fluid flow through the drain port 130 when the solenoid 140 is in the closed position. The solenoid 140 may be secured to automatic drain system 100 by at least one attachment apparatus, such as screws. In some embodiments, a biasing member is provided to maintain the solenoid plunger in the closed position, except when the solenoid 140 is activated. The biasing member may comprise a coil spring or another form of spring in various embodiments. In such embodiments, the biasing member provides a biasing force that maintains the solenoid plunger in a closed position to prevent flow through the drain port 130. The activation (e.g. charge, current draw, etc.) of the solenoid 140 counteracts the biasing force of the biasing member, causing the solenoid plunger to move to the open position thereby allowing flow through the drain port 130. In other words, the biasing member is configured to bias the solenoid plunger to the extended, closed position until the solenoid is charged and causes the plunger to retract to the retracted state. Once the charge is removed from the solenoid 140, the solenoid plunger extends to the extended state. Such an arrangement ensures that in the event of a failure of the solenoid 140 the automatic drain system 100 will be maintained in a closed position by the biasing force of the biasing member.

Figure 2:
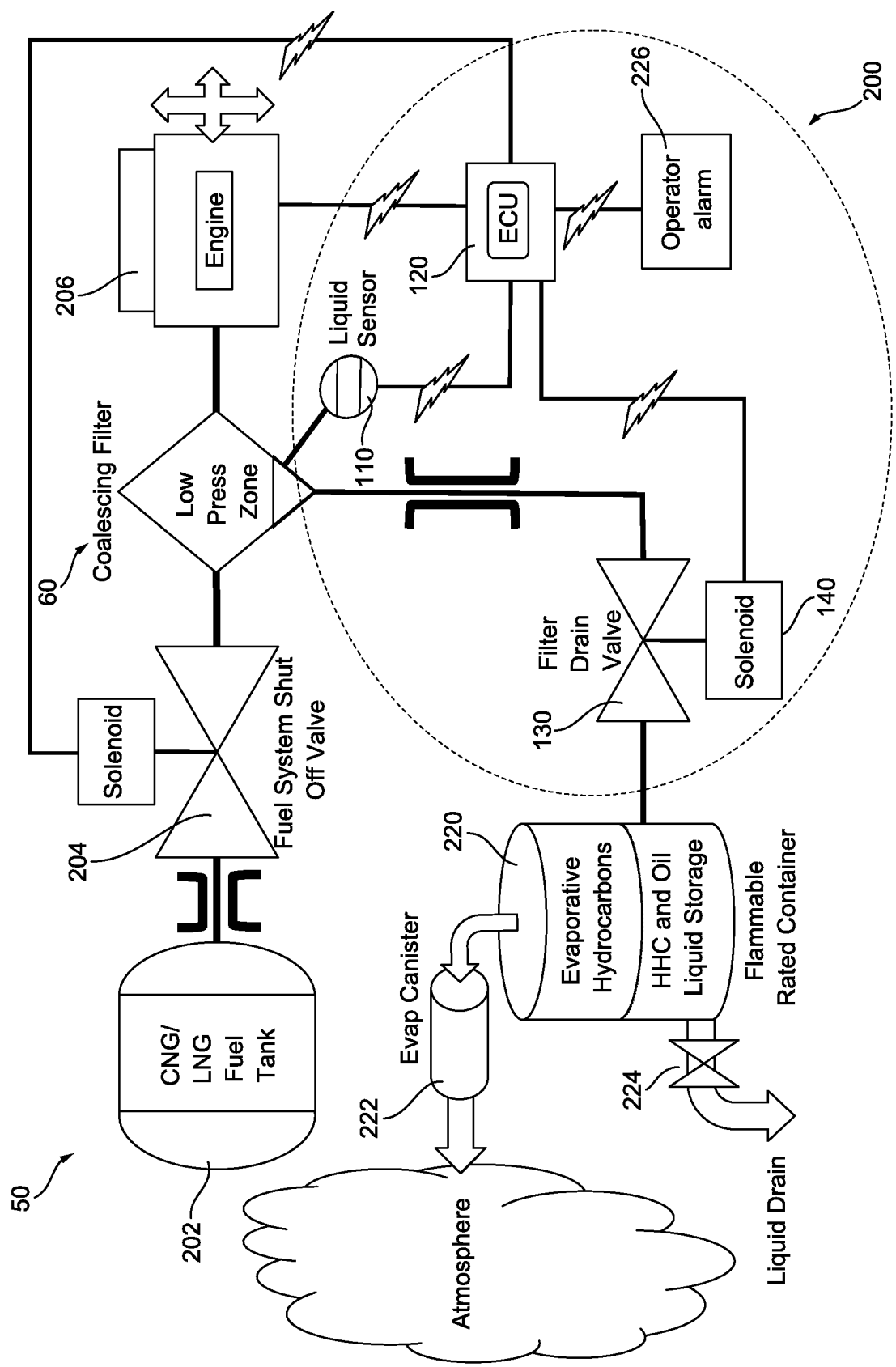
FIG. 2 is a schematic diagram of using an automatic drain system to automatically drain a FWS filter system, according to an example embodiment.

Referring to FIG. 2, a schematic diagram of using an automatic drain system 200 to automatically drain a FWS filter system 50 is shown, according to an example embodiment. The automatic drain system 200 can be similar to the automatic drain system 100 of FIGS. 1A & 1B. As will be appreciated, the automatic drain system 200 is structured to monitor the collected liquid level in the FWS filter system 50 and automatically drain the liquids once a pre-determined level is reached.

As shown in FIG. 2, the FWS filter system 50 includes a pressurized fuel tank 202, a fuel system shut off valve 204, a FWS 60, an engine 206, the automatic drain system 200, and an collection container 220. The FWS 60 can be similar to one or more of the embodiments of the FWS 10 described above in FIGS. 1A & 1B. As will be appreciated, the automatic drain system 200 can automatically drain when the engine 206 is in an "on" or "off" state. During normal operation, pressurized fuel from the fuel tank 202 is filtered through the FWS 60 and used by the engine 206. Filtered liquids are collected in a liquid collection sump 20 monitored by the automatic drain system 200.

The FWS filter system 50 includes the collection container 220. The collection container 220 receives drained collected liquids from the automatic drain system 200. The collection container 220 may be externally located, and the collection container 220 may be removable and replaceable from the FWS 60 and the automatic drain system 200. In other embodiments, the collection container 220 includes a drain valve for draining the collected liquids. In some embodiments, the collection container includes an evaporation canister 222 that receives evaporative hydrocarbons, and cleans the hydrocarbons through an absorption agent, thereby releasing clean air out of the FWS filter system 50.

The automatic drain system 200 includes a WIF sensor 110, a controller 120 (e.g., an ECU controller), a drain port 130, a solenoid 140, and an operator alert system 226. The controller 120 is communicably coupled to the WIF sensor 110 and operably connected to the solenoid 140. The WIF sensor 110 is disposed in the liquid collection sump 20 of the FWS 60. At some period during the operation of the FWS filter system 50, the level of the collected liquids in the liquid collection sump 20 trigger the WIF sensor 110. As a result, the WIF sensor 110 contacts the controller 120 with the information. The controller 120 receives the WIF sensor 110 reading and initiates the automatic drain process. In some embodiments, the ECU controller may wait for the engine 206 to turn off before initiating the automatic drain process.

The automatic drain process continues with the controller 120 causing the solenoid 140 to attain an open position. The automatic drain system 200 can be configured to automatically drain when the engine 206 is not in operation, is in operation, or either. If drained during the operation of the engine 206, the pressure in the FWS filter system 50 will force (e.g., "push") the collected liquids from the liquid collection sump 20, through the open solenoid 140, and out of the drain port 130. If the controller 120 waits for the engine 206 to turn off before opening the solenoid 140, the residual pressure in the FWS 60 forces (e.g., push) the collected liquids from the liquid collection sump 20, through the open solenoid 140, and out of the drain port 130. The drain port 130 may have a cross-section of a wide variety of target shapes and sizes that define the flow rate out of the FWS 60, as well as the pressure to the external (e.g., not part of the FWS 60) collection container 220.

In some embodiments, the automatic drain process of the liquid collection sump 20 concludes when the WIF sensor 110 no longer detects collected liquid in the liquid collection sump 20. Alternatively, the automatic drain process of the liquid collection sump 20 concludes when a lower WIF sensor 110—in multiple WIF sensor embodiments—senses the collected liquid in the liquid collection sump 20 is below a determined level. In either embodiment, the WIF sensor 110 sends a signal to the controller 120, causing the solenoid 140 to close. In certain embodiments, the solenoid 140 is closed by the controller 120 after a predetermined amount of time has elapsed. The predetermined amount of time is associated with a calculated flow rate based on the orifice size, triggering liquid volume, average pressure, and average liquid density. Depending on the calculated flow rate and desired remaining liquid volume (e.g., an empty liquid collection sump 20), a timer algorithm in the controller 120 determines how long the solenoid 140 should remain open.

In embodiments where the solenoid 140 opens only when the engine 206 is off, the ECU controller may engage the fuel system shut off valve 204 to prevent activation of the engine 206 while the drain port 130 is open. The controller 120 may provide an alert or message to the operator to indicate the status of the draining process (e.g., active, completed, liquids in the collection container 220, etc.). In some embodiments, the operator is required to manually reset (e.g., push a button) the automatic drain system 200 to allow for engine 206 start up.

Throughout the automatic draining process, the operator may be alerted to one or more status changes through the operator alert system 226. The controller 120 may cause the operator alert system 226 to provide details to the operator regarding the current status or state of the automatic drain system 200 and one or more components of the FWS filter system 50. For example, one or more of the sensors in the automatic drain system 200 can alert the operator alert system 226 of the presence of contaminated fuel in a component of the FWS filter system 50. Additionally, a sensor in the collection container 220 or in the evaporation canister 222 can alert the operator through the operator alert system 226 to the presence and level of drip gas, evaporative hydrocarbons, or other gases. In some embodiments, the operator alert system 226 is communicably connected to an operator mobile computing device (e.g., smart phone, laptop, tablet, etc.) to provide alerts on the operator mobile computing device. The operator alert system 226 can notify the operator of completion of the automatic drain process, the disposition of contents in the collection container 220, and when to open a release valve 224 on the collection container 220 to drain the liquids from the collection container 220.

Figure 3:
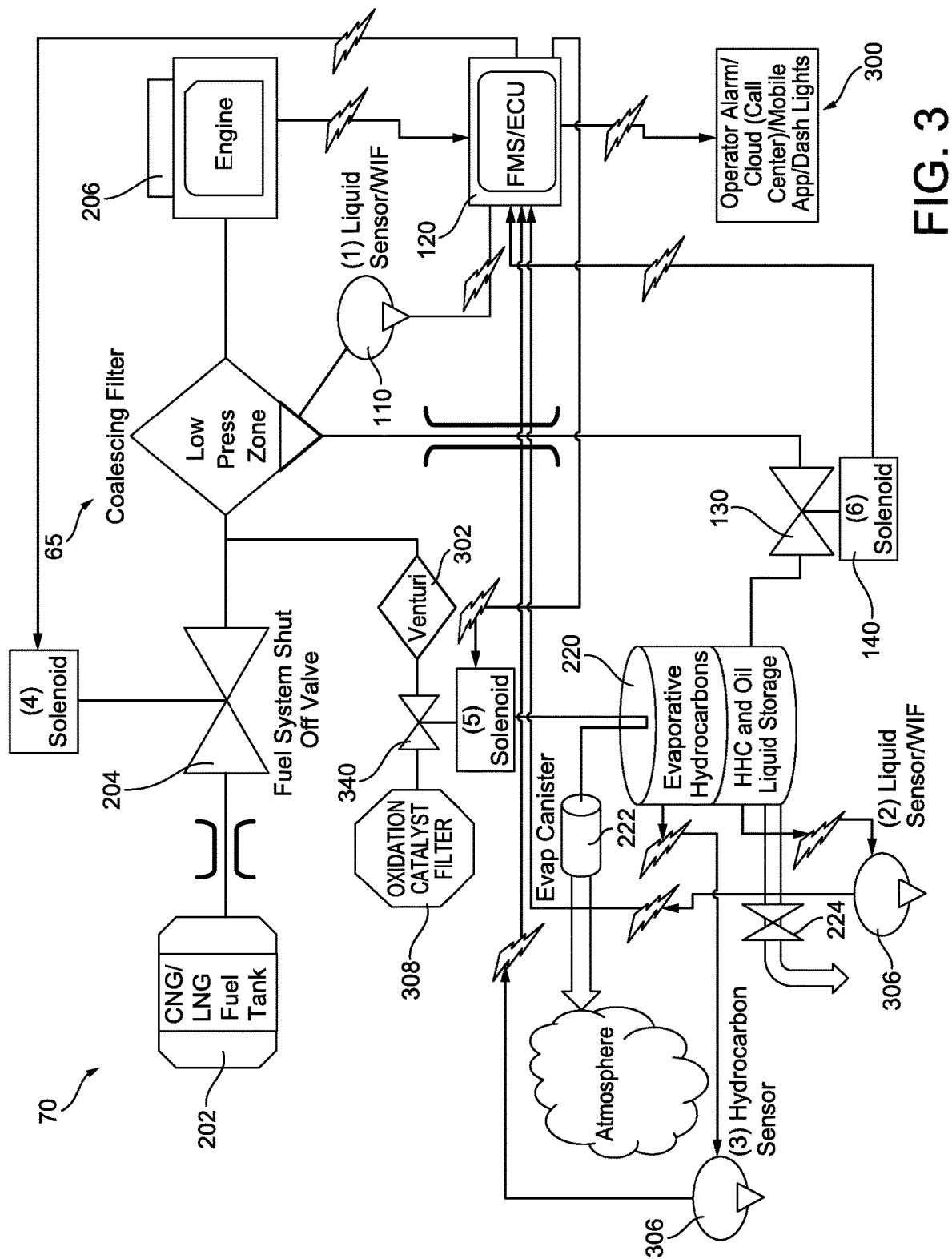
FIG. 3 is a schematic diagram of automatically draining a pressurized fuel water separator with an automatic drain system, according to a further example embodiment.

Referring to FIG. 3, a schematic diagram of automatically draining a FWS filter system 70 using the automatic drain system 300 is shown, according to an example embodiment. The automatic drain system 300 is similar to the automatic drain system 200. A difference between the automatic drain system 300 and the automatic drain system 200 is the automatic drain system 300 has more sensors throughout the FWS filter system 70. Accordingly, like numbering is used to designate like parts between the automatic drain system 300 and the automatic drain system 200. The FWS filter system 70 is similar to the FWS filter system 50. A difference between the FWS filter system 70 and the FWS filter system 50 is the ability to inject the hydrocarbons back upstream to a FWS 65 so not to release the gases to the atmosphere in the FWS filter system 70. Accordingly, like numbering is used to designate like parts between the FWS filter system 70 and the FWS filter system 50.

As shown in FIG. 3, the FWS filter system 70 includes a pressurized fuel tank 202, a fuel system shut off valve 204, the FWS 65, an engine 206, the automatic drain system 200, a collection container 220, an oxidation catalyst/particulate filter 308, a solenoid 340, and a check valve (e.g., venturi type suction valve) 302. The FWS 65 can be similar to one or more of the embodiments of the FWS 10 described above in FIGS. 1A & 1B. As will be appreciated, the automatic drain system 300 can automatically drain when the engine 206 is in an "on" or "off" state. During normal operation, pressurized fuel from the fuel tank 202 is filtered through the FWS 65 and used by the engine 206. Filtered liquids are collected in a liquid collection sump 20 monitored by the automatic drain system 300.

The automatic drain system 300 includes a WIF sensor 110, a controller 120, a drain port 130, a solenoid 140, an operator alert system 226, the collection container 220, a collection container sensor 304, and an HC ("hydrocarbon") sensor 306. The controller 120 is communicably coupled to the WIF sensor 110, the collection container sensor 304, and the HC sensor 306. The ECU controller is operably connected to the solenoid 140 and the solenoid 340. The WIF sensor 110 is disposed in the liquid collection sump 20 of the FWS 65. At some period during the operation of the FWS filter system 70, the level of the collected liquids in the liquid collection sump 20 triggers the WIF sensor 110. As a result, the WIF sensor 110 contacts the controller 120 with the information. The controller 120 receives the WIF sensor reading and initiates the automatic drain process. In some embodiments, the ECU controller may wait for the engine 206 to turn off before initiating the automatic drain process.

The collection container 220 receives drained collected liquids from the automatic drain system 300. The collection container 220 may be removable and replaceable from the automatic drain system 300 or external from the automatic drain system 300. In other embodiments, the collection container 220 includes a drain valve for draining the collected liquids. In some embodiments, the collection container includes an evaporation canister 222 that receives evaporative hydrocarbons, and cleans the hydrocarbons through an absorption agent, thereby releasing clean air out of the FWS filter system 70.

The automatic drain process continues with the controller 120 causing the solenoid 140 to attain an open position. As will be appreciated, during operation of the engine 206, the pressure in the FWS filter system 70 will force (e.g., push) the collected liquids from the liquid collection sump 20, through the open solenoid 140, and out of the drain port 130. If the controller 120 waits for the engine 206 to turn off before opening the solenoid 140, the residual pressure in the FWS 65 forces (e.g., push) the collected liquids from the liquid collection sump 20, through the open solenoid 140, and out of the drain port 130. The drain port 130 may have a cross-section of a wide variety of target shapes and sizes that define the flow rate out of the FWS 65, as well as the pressure to the collection container 220.

In some embodiments, the automatic drain process of the liquid collection sump 20 concludes when the WIF sensor 110 no longer detects collected liquid in the liquid collection sump 20. Alternatively, the automatic drain process of the liquid collection sump 20 concludes when a lower WIF sensor 110—in multiple WIF sensor embodiments—senses the collected liquid in the liquid collection sump 20 is below a determined level. In either embodiments, the WIF sensor 110 sends a signal to the controller 120 that in turn causes the solenoid 140 to close. In certain embodiments, the solenoid 140 is closed by the controller 120 after a predetermined amount of time has elapsed. The predetermined amount of time is associated with a calculated flow rate based on the orifice size, triggering liquid volume, average pressure, and average liquid density. Depending on the calculated flow rate and desired remaining liquid volume (e.g., an empty liquid collection sump 20), a timer algorithm in the controller 120 determines how long the solenoid 140 should remain open. As will be appreciated, optimizing the time the solenoid 140 is open is important to reduce the amount of gases—if any—reach the environment during the draining process. In other embodiments, a viscosity sensor is used to determine when to close the solenoid 140. The viscosity sensor receives the collected liquids between the FWS 65 and the drain port 130. The viscosity sensor outputs a signal to the controller 120 representative of viscosity of the liquid(s). The determined viscosity is used to further calculate a flow rate to determine how long the solenoid 140 should remain open.

In embodiments where the solenoid 140 opens only when the engine 206 is off, the ECU controller may engage the fuel system shut off valve 204 to prevent activation of the engine 206 while the drain port 130 is open. In other embodiments, the controller 120 may provide an alert or message to the operator to indicate the status of the draining process (e.g., active, completed, liquids in the collection container 220, etc.). In some embodiments, the operator may be required to manually reset (e.g., push a button) the automatic drain system 300 to allow for engine 206 start up.

The collection container 220 stores heavy hydrocarbons, evaporative hydrocarbons, and liquids. As shown in FIG. 3, a HC sensor 306 and the collection container sensor 304 (e.g., a second WIF sensor) are be disposed in the collection container 220. The collection container sensor 304 is substantially similar to the WIF sensor 110 described above. The collection container sensor 304 monitors the level of liquids in the collection container 220 and notifies the operator, by way of the controller 120 and operator alert system 226, that the collection container 220 needs to be removed and emptied or replaced. A manual valve may be disposed on the collection container 220 to facilitate evacuation of the collected liquids from the collection container 220 to the environment.

The collection container 220 is also structured to allow for reinjection of the hydrocarbons upstream of the FWS 65 so not to release gases to the atmosphere on a daily basis. An HC sensor 306 is disposed in the collection container 220 in a location preferable to detect levels of hydrocarbons. Once a sufficient hydrocarbon level is attained, the HC sensor 306 notifies the controller 120. The controller 120 facilitates the opening of a solenoid 340 to allow the evaporative hydrocarbons to an oxidation catalyst/particulate filter 308. The evaporative hydrocarbons pass through the oxidation catalyst and then in the oxidation catalyst/particulate filter 308 where the hydrocarbons undergo regeneration. The regenerated hydrocarbons are passed through a check valve 302 and reintroduced upstream the FWS 65. In some embodiments, hydrocarbons that remain in the collection container 220 are sent to the evaporation canister 222 to either be absorbed or burned off to create clean air to be released into the environment.

Throughout the automatic draining process, the operator may be alerted to one or more status changes through the operator alert system 226. The controller 120 may cause the operator alert system 226 to provide details to the operator regarding the current status or state of the automatic drain system 300 and one or more components of the FWS filter system 70. For example, one or more of the sensors in the automatic drain system 300 can alert the operator alert system 226 of the presence of contaminated fuel in a component of the FWS filter system 70. Additionally, a sensor in the collection container 220 or in the evaporation canister 222 can alert the operator through the operator alert system 226 to the presence and level of drip gas, evaporative hydrocarbons, or other gases. In some embodiments, the operator alert system 226 is communicably connected to an operator mobile computing device (e.g., smart phone, laptop, tablet, etc.) to provide alerts on the operator mobile computing device. The operator alert system 226 can notify the operator of completion of the automatic drain process, the disposition of contents in the collection container 220, and when to open a release valve 224 on the collection container 220 to drain the liquids from the collection container 220.

Implementations described in this specification can be implemented in digital electronic circuitry, or in computer software, firmware, or hardware, including the structures disclosed in this specification and their structural equivalents, or in combinations of one or more of them. The implementations described in this specification can be implemented as one or more computer programs, i.e., one or more modules of computer program instructions, encoded on one or more computer storage media for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be performed by a controller or a data processing apparatus on data stored on one or more computer-readable storage devices or received from other sources. The term "data processing apparatus" or "controller" encompasses all kinds of apparatus, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

The functional units described in this specification may be considered to be modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like. Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Additionally, it should be understood that features from one embodiment disclosed herein may be combined with features of other embodiments disclosed herein as one of ordinary skill in the art would understand. Other substitutions, modifications, changes and omissions may also be made in the design, operating conditions and arrangement of the various exemplary embodiments without departing from the scope of the present invention.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed:

1. An automatic drain system for use with a fluid water separator, the automatic drain system comprising:
   a liquid-in-fuel sensor, the liquid-in-fuel sensor configured to detect a liquid level in a water sump of the fluid water separator;
   a first solenoid fluidly coupled to and positioned downstream of the fluid water separator;
   a hydrocarbon and liquid storage tank fluidly coupled to and positioned downstream of the first solenoid;
   a sensor configured to detect a level of hydrocarbons in the hydrocarbon and liquid storage tank;
   a second solenoid fluidly coupled to and positioned downstream of the hydrocarbon and liquid storage tank; and
   a control unit configured to:
      activate the first solenoid in response to a signal from the liquid-in-fuel sensor and activate the second solenoid in response to a signal from the sensor configured to detect the level of hydrocarbons in the hydrocarbon and liquid storage tank,
      wherein activation of the first solenoid causes the first solenoid to change from a closed state to an open state and places the automatic drain system in a condition allowing fluid flow through the automatic drain system from the water sump to the hydrocarbon and liquid storage tank, and wherein activation of the second solenoid causes the second solenoid to change from a closed state to an open state and allows evaporative hydrocarbons to be reintroduced upstream of the fluid water separator.

2. The automatic drain system of claim 1, further comprising an operator alert system communicably connected to the control unit, the operator alert system configured to alert an operator of the fluid water separator to a condition of the fluid water separator.

3. The automatic drain system of claim 2, wherein the condition of the fluid water separator comprises at least one of activation of the first solenoid, deactivation of the first solenoid, and drainage of the fluid flow through the automatic drain system.

4. The automatic drain system of claim 1, wherein deactivation of the first solenoid causes the first solenoid to change from the open state to the closed state so as to prevent fluid flow through the automatic drain system.

5. The automatic drain system of claim 4, wherein the change to the closed state occurs after a drain time, the drain time associated with flow rate based on orifice size through the automatic drain system, triggering liquid level, average pressure in the automatic drain system, and average liquid density.

6. The automatic drain system of claim 1, wherein the first solenoid comprises a plunger, the plunger having a retracted state associated with the open state of the first solenoid and an extended state associated with the closed state of the first solenoid.

7. The automatic drain system of claim 6, further comprising a biasing member structured to bias the plunger towards the extended state, the first solenoid comprising a charged state and an uncharged state, wherein the charged state causes the plunger to retract to the retracted state, and wherein the uncharged state causes the plunger to extend to the extended state.

8. The automatic drain system of claim 1, wherein the liquid in-fuel-sensor comprises a first liquid-in-fuel sensor and a second liquid-in-fuel sensor, the first liquid-in-fuel sensor disposed axially along the water sump above the second liquid-in-fuel sensor, the first liquid-in-fuel sensor configured to detect an upper liquid level of the water sump and the second liquid-in-fuel sensor configured to detect a lower liquid level of the water sump, detection of the upper liquid level causing the control unit to activate the first solenoid, wherein absence of the lower liquid level causes the control unit to deactivate the first solenoid to cause the first solenoid to change from the open state to the closed state.

9. The automatic drain system of claim 1, wherein hydrocarbons that remain in the hydrocarbon and liquid storage tank when the second solenoid is deactivated are received by an evaporation canister to either be absorbed or burned off so as to create clean air to be released into a surrounding environment.

10. The automatic drain system of claim 1, wherein the control unit is further configured to deactivate the first solenoid to change from the open state to the closed state and place the automatic drain system in a condition preventing fluid flow through the automatic drain system from the water sump to the hydrocarbon and liquid storage tank after a period of time from activation of the first solenoid.

11. The automatic drain system of claim 1, further comprising a housing, the housing comprising:
at least one vent;
an inlet opening that allows fluid to flow into an interior of the automatic drain system; and
a drain opening that allows fluid to flow from the water sump of the fluid water separator to the hydrocarbon and liquid storage tank.

12. A fluid water separator system comprising:
a housing, the housing including at least one vent, an inlet opening that allows fluid to flow into an interior of the fluid water separator system, and a drain opening that allows fluid to flow from a water sump of a fuel water separator;
a liquid-in-fuel sensor, the liquid-in-fuel sensor configured to detect a liquid level in the water sump of the fuel water separator;
a first solenoid fluidly coupled to and positioned downstream of the fuel water separator;
a hydrocarbon and liquid storage tank fluidly coupled to and positioned downstream of the first solenoid;
a sensor configured to detect a level of hydrocarbons in the hydrocarbon and liquid storage tank;
a second solenoid fluidly coupled to and positioned downstream of the hydrocarbon and liquid storage tank; and
a control unit configured to:
activate the first solenoid in response to a signal from the liquid-in-fuel sensor and activate the second solenoid in response to a signal from the sensor configured to detect the level of hydrocarbons in the hydrocarbon and liquid storage tank,
wherein activation of the first solenoid causes the first solenoid to change from a closed state to an open state and places the fluid water separator system in a condition allowing fluid flow through the fluid water separator system from the water sump to the hydrocarbon and liquid storage tank, and
wherein activation of the second solenoid causes the second solenoid to change from a closed state to an open state and allows evaporative hydrocarbons to be reintroduced upstream of the fuel water separator.

13. The fluid water separator system of claim 12, further comprising an operator alert system communicably connected to the control unit, the operator alert system configured to alert an operator of the fluid water separator system to a condition of the fluid water separator system.

14. The fluid water separator system of claim 12, wherein hydrocarbons that remain in the hydrocarbon and liquid storage tank when the second solenoid is deactivated are received by an evaporation canister to either be absorbed or burned off so as to create clean air to be released into a surrounding environment.

15. The fluid water separator system of claim 12, wherein deactivation of the first solenoid causes the first solenoid to change from the open state to the closed state so as to prevent fluid flow through the fluid water separator system.

16. The fluid water separator system of claim 15, wherein the change to the closed state occurs after a drain time, the drain time associated with flow rate based on orifice size through the fluid water separator system, triggering liquid level, average pressure in the fluid water separator system, and average liquid density.

17. The fluid water separator system of claim 12, wherein the first solenoid comprises a plunger, the plunger having a retracted state associated with the open state of the first solenoid and an extended state associated with the closed state of the first solenoid.

18. The fluid water separator system of claim 17, further comprising a biasing member structured to bias the plunger towards the extended state, the first solenoid comprising a charged state and an uncharged state, wherein the charged state causes the plunger to retract to the retracted state, and wherein the uncharged state causes the plunger to extend to the extended stated.

19. The fluid water separator system of claim 12, wherein the liquid-in-fuel sensor comprises a first liquid-in-fuel sensor and a second liquid-in-fuel sensor, the first liquid-in-fuel sensor disposed axially along the water sump above the second liquid-in-fuel sensor, the first liquid-in-fuel sensor configured to detect an upper liquid level of the water sump and the second liquid-in-fuel sensor configured to detect a lower liquid level of the water sump, detection of the upper liquid level causing the control unit to activate the first solenoid, wherein absence of the lower liquid level causes the control unit to deactivate the first solenoid to cause the first solenoid to change from the open state to the closed state.

20. The fluid water separator system of claim 12, wherein the control unit is further configured to alert an operator of the fluid water separator system to a condition of the hydrocarbon and liquid storage tank.

\* \* \* \* \*